United States Patent
Nikolic et al.

(10) Patent No.: US 9,738,378 B1
(45) Date of Patent: Aug. 22, 2017

(54) DISPLAY-BASED FLIGHT DECK AUTOBRAKE SELECTION

(71) Applicant: The Boeing Company, Chicago, IL (US)

(72) Inventors: Mark Ivan Nikolic, Seattle, WA (US); Joseph A. Sikora, Seattle, WA (US); William Lawrence Hunt, Tacoma, WA (US); Jean M. Crane, Seattle, WA (US); Jennifer L. Gertley, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/094,337

(22) Filed: Apr. 8, 2016

(51) Int. Cl.
*B64C 25/42* (2006.01)
*B64D 43/00* (2006.01)

(52) U.S. Cl.
CPC ............ *B64C 25/426* (2013.01); *B64D 43/00* (2013.01)

(58) Field of Classification Search
CPC .............................. B64C 25/426; B64D 43/00
See application file for complete search history.

(56) References Cited

U.S. PATENT DOCUMENTS

| | | | |
|---|---|---|---|
| 4,327,413 A * | 4/1982 | Ruof | B60T 8/1703 244/111 |
| 5,968,106 A | 10/1999 | DeVlieg et al. | |
| 6,107,943 A | 8/2000 | Schroeder | |
| 7,766,431 B2 * | 8/2010 | Griffith | B60T 7/12 303/126 |
| 7,818,100 B2 * | 10/2010 | Goodman | B64C 25/426 244/111 |
| 2013/0249814 A1 * | 9/2013 | Zeng | G06F 3/0488 345/173 |
| 2014/0136069 A1 * | 5/2014 | Jung | B60T 13/662 701/70 |
| 2015/0123912 A1 | 5/2015 | Nikolic et al. | |
| 2016/0264254 A1 * | 9/2016 | Jajur | B64D 43/00 |

FOREIGN PATENT DOCUMENTS

WO    WO2007/006310 A2 *  1/2007

OTHER PUBLICATIONS

"B737 Auto Brakes—Converting & Using a Genuine Auto Brake," Flaps 2 Approach, Mar. 2013, 6 pages, accessed Mar. 18, 2016. http://www.flaps2approach.com/journal/2013/3/18/b737-auto-brakes-converting-using-a-genuine-auto-brake.html.

* cited by examiner

*Primary Examiner* — Michael J Zanelli
(74) *Attorney, Agent, or Firm* — Yee & Associates, P.C.

(57) ABSTRACT

A system and method for braking an aircraft. A processor unit identifies an operating condition of the aircraft. The processor unit displays available modes indications on a display device on the aircraft. The available modes indications indicate modes of operating an automatic braking system on the aircraft that are available for selection by an operator based on the operating condition of the aircraft. The processor unit receives a mode selection from an operator interface. The mode selection indicates a selected mode of operating the automatic braking system that is selected by the operator from the available modes. The processor unit displays on the display device a selected mode indication indicating the selected mode.

20 Claims, 9 Drawing Sheets

DISPLAY-BASED FLIGHT DECK AUTOBRAKE SELECTION

BACKGROUND INFORMATION

1. Field

The present disclosure relates generally to aircraft and in particular to systems and methods for controlling braking of an aircraft. Still more particularly, the present disclosure relates to a system and method for controlling the operation of an automatic braking system on an aircraft by a pilot on the flight deck of the aircraft.

2. Background

A pilot of an aircraft may use various displays, controls, and indicators on the flight deck of the aircraft to monitor and control the operation of various aircraft systems. Traditionally, numerous analog devices, such as mechanical gauges and dials, are used to display information on the flight deck of an aircraft.

Modern aircraft often include an automatic braking system. The automatic braking system automatically controls the brakes of the aircraft to decelerate the aircraft during a rejected takeoff and during landing. This automatic braking action improves braking performance and frees the pilot to focus on other tasks.

Currently, controls and indicators for various modes and settings that govern the operation of the automatic braking system may be presented using the analog devices. For example, without limitation, the controls for selecting the various modes may be presented on a mechanical gauge and dial on an instrument panel on the flight deck.

However, the instrument panel may also include displays for other systems of the aircraft. As the number of instruments and controls on the instrument panel increases, the space on the instrument panel may be limited. As such, the allowable size of the analog devices for controlling the automatic braking system may be limited. Furthermore, additional or new modes of operation of the automatic braking system may not be supported on analog devices.

Therefore, it would be desirable to have a method and apparatus that take into account at least some of the issues discussed above, as well as other possible issues.

SUMMARY

The illustrative embodiments of the present disclosure provide a method of braking an aircraft. A processor unit identifies an operating condition of the aircraft. The processor unit displays available modes indications on a display device on the aircraft. The available modes indications indicate modes of operating an automatic braking system on the aircraft that are available for selection by an operator based on the operating condition of the aircraft. The processor unit receives a mode selection from an operator interface. The mode selection indicates a selected mode of operating the automatic braking system that is selected by the operator from the available modes. The processor unit displays on the display device a selected mode indication indicating the selected mode.

The illustrative embodiments of the present disclosure also provide a system comprising an operator interface and a display generator. The display generator is configured to display available modes indications and a selected mode indication on a display device on an aircraft. The available modes indications indicate available modes of operating an automatic braking system on the aircraft that are available for selection by an operator based on an operating condition of the aircraft. The selected mode indication indicates a selected mode of operating the automatic braking system that is selected by the operator from the available modes using the operator interface.

The illustrative embodiments of the present disclosure also provide a system comprising an operator interface and a display generator. The operator interface comprises a rotatable knob. The display generator is configured to display available modes indications and a selected mode indication on a display device on an aircraft. The available modes indications indicate available modes of operating an automatic braking system on the aircraft that are available for selection by an operator based on an operating condition of the aircraft. The selected mode indication indicates a selected mode of operating the automatic braking system that is selected by the operator from the available modes by rotating the rotatable knob.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
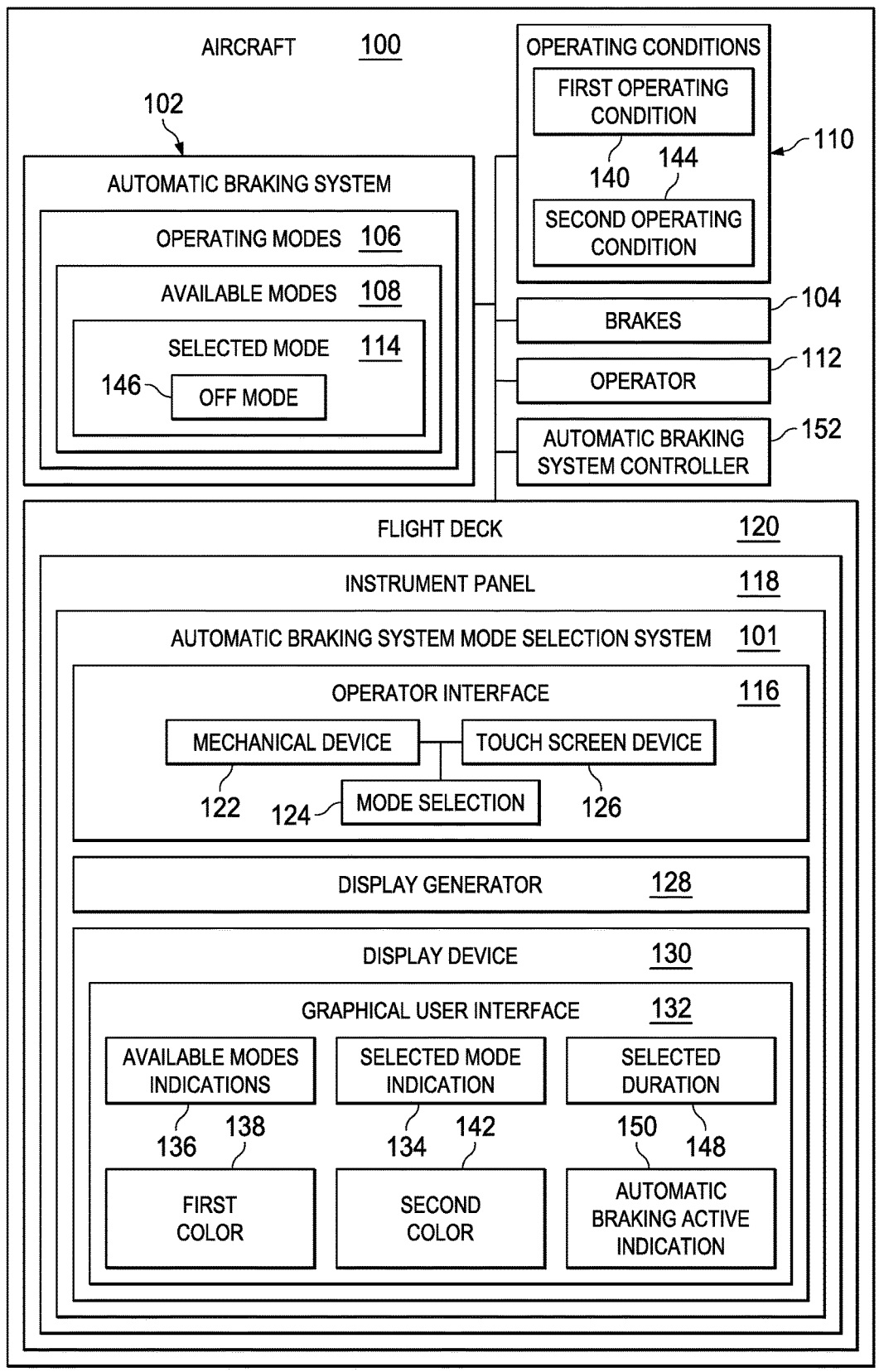
FIG. 1 is an illustration of a block diagram of an automatic braking system mode selection system for an aircraft in accordance with an illustrative embodiment.

The different illustrative embodiments recognize and take into account a number of different considerations. "A number of", as used herein with reference to items, means one or more items. For example, "a number of different considerations" means one or more different considerations.

The different illustrative embodiments recognize and take into account that, currently, an automatic braking system on an aircraft includes several modes of operation that are selectable by an operator. For example, the operator of the aircraft may control and interact with the automatic braking system using an analog control device, such as a button or a knob mounted on an instrument panel. The different illustrative embodiments also recognize and take into account that the operator may prefer a tactile response and familiarity of the analog control device. The analog control device may display the available modes of the automatic braking system and allow the operator to select a mode in the available modes. The analog control device may include embedded selection logic that governs the available modes. For example, the analog control device may use a system of mechanical interlocks, electro-mechanical interlocks, and the like to prevent the selection of modes that are not available. The different illustrative embodiments recognize and take into account that such interlocks may not clearly indicate to the operator the modes that are available for selection. The different illustrative embodiments recognize and take into account that the analog control device may be more difficult than desired to modify to accommodate new modes of operating the automatic braking system and/or remove undesired modes of operating the automatic braking system.

The different illustrative embodiments also recognize and take into account that analog controls may require more maintenance than desired and may need to be reworked or replaced more often than desired. For example, analog controls with mechanical interlocks include moving parts that may develop inconsistencies over time. Therefore, such analog controls may need to be inspected relatively often and may need to be reworked or replaced more often than may be desirable.

The different illustrative embodiments also recognize and take into account that such analog control device may be expensive, add weight to the aircraft, and take up space on the instrument panel or the flight deck. For example, the mechanical interlocks may take up more space than desired on the instrument panel. As another example, improvements in capabilities of the automatic braking system may not be possible or may require relatively expensive and time-consuming hardware changes on the instrument panel to accommodate the analog control device. In other cases, there may be insufficient space available on an existing instrument panel for the analog control device.

The illustrative embodiments provide systems and methods for controlling and interacting with an automatic braking system. In accordance with various embodiments, control logic for selecting a mode of operation of the automatic braking system is controlled by software. The control logic governing the operation of the automatic braking system may be separated from the device used to interact with the automatic braking system. The user interface may be simplified.

The illustrative embodiments provide systems and methods for controlling and interacting with an automatic braking system. In accordance with illustrative embodiments, various displays and operator interfaces may be provided on the flight deck of an aircraft. An operator of the aircraft may control and interact with the automatic braking system by intuitive and user-friendly operator interactions with the operator interfaces. For example, in accordance with an illustrative embodiment, an aircraft may include a number of displays on an instrument panel in a flight deck. The displays may indicate available operating modes of the automatic braking system.

The displays may be controlled by an operator interface. The operator interface may be a device that the operator interacts with to provide input indicating a selected mode of operation of the automatic braking system. For example, in various embodiments, the operator interface may be a touch-screen interface. Alternatively, in other embodiments, the operator interface may be a mechanical device that is movable by the operator to select the selected mode of operation. The operator interface may be separate and remote from the display. By decoupling the operator interface and the display, the amount of space required on the instrument panel may be reduced.

The illustrative embodiments may adapt current displays on the flight deck of an aircraft for controlling the operation of an automatic braking system on the aircraft. The illustrative embodiments may combine the benefits of a familiar tactile response of a mechanical user interface device with a digital software controlled user interface for controlling the operation of the automatic braking system.

The illustrative embodiments may allow for the reduction of hardware for controlling and interacting with the automatic braking system on an aircraft. Allowing for the removal of hardware may reduce the weight and cost of the aircraft and may increase the space available on the flight deck. The illustrative embodiments also may reduce the cost and installation time for adding functionality to the displays on the flight deck of an aircraft and may make such improvements possible or practical in some cases.

Turning to FIG. 1, an illustration of a block diagram of an automatic braking system mode selection system for an aircraft is depicted in accordance with an illustrative embodiment. Aircraft 100 may be a commercial passenger aircraft, a cargo aircraft, a rotorcraft, an airplane, a military aircraft, or any other type of aircraft. Aircraft 100 may include automatic braking system mode selection system 101 for selecting braking modes for controlling automatic braking system 102.

Aircraft 100 may include automatic braking system 102 for performing various braking functions on aircraft 100. Automatic braking system 102 may control the deceleration of aircraft 100. For example without limitation, automatic braking system 102 may control the application of braking pressure to brakes 104 of aircraft 100 to control a rate of deceleration of aircraft 100. As another example, automatic braking system 102 may control brakes 104 of aircraft 100 to slow aircraft 100 to a target speed. As another example, automatic braking system 102 may control the operation of brakes 104 to slow aircraft 100 to a target speed before aircraft 100 reaches a selected position on the ground, such as a selected point on a runway. As another example, automatic braking system 102 may automatically stop aircraft 100 upon landing. As another example, automatic braking system 102 may automatically stop aircraft 100 within a predetermined distance.

Automatic braking system 102 may include a number of operating modes 106 that control the operation of automatic braking system 102. Operating modes 106 may prescribe or otherwise govern the amount of braking control to apply to brakes 104. Operating modes 106 may be predetermined based on capabilities of aircraft 100. Operating modes 106 may be available to be applied only in specific operating conditions 110 of aircraft 100. For example, without limitation, operating modes 106 may govern the rate of deceleration and the amount of braking pressure to apply to brakes 104.

Operating modes 106 may include available modes 108 that are available to be engaged based on operating conditions 110 of aircraft 100. Operating conditions 110 of aircraft 100 may be based on a state of aircraft 100, such as, for example, in flight, on ground, on approach, location on ground, and the like. For example, without limitation, some of operating modes 106 may be available modes 108 when aircraft 100 is on ground. Alternatively, some of operating modes 106 may not be available when aircraft 100 is on ground, and may be available modes 108 only when aircraft 100 is in flight. In other embodiments, other arrangements are possible.

Automatic braking system controller 152 may determine which operating modes 106 are available modes 108 based on operating conditions 110 of aircraft 100. Automatic braking system controller 152 may be embodied as a software application. Automatic braking system controller 152 may include software control logic to determine which operating modes are available modes 108, and of available modes 108, which is selected mode 114.

Operator 112 may choose selected mode 114 from available modes 108. Operator 112 may be a member of the flight crew for aircraft 100. For example, without limitation, operator 112 may be a pilot, co-pilot, or other member of the flight crew for aircraft 100. Operator 112 may monitor the operation of automatic braking system 102, control the operation of automatic braking system 102, or both monitor and control the operation of automatic braking system 102 to choose selected mode 114. Selected mode 114 may be chosen to activate automatic braking system 102 such that automatic braking system 102 performs preprogrammed automatic braking. Selected mode 114 may be referred to as a desired operating mode.

Operator 112 may choose selected mode 114 from available modes 108 by interacting with operator interface 116. Operator interface 116 may be situated on instrument panel 118 in flight deck 120 of aircraft 100. Operator interface 116 may be implemented using any appropriate input control device for receiving input from operator 112. For example, without limitation, operator interface 116 may be mechanical device 122 that is movable by operator 112 to select selected mode 114 from available modes 108 of operation of automatic braking system 102. For example, mechanical device 122 may be a rotary switch or a knob. Mechanical device 122, such as the knob, may provide a tactile input method that is familiar and preferred by operator 112. Alternatively or additionally, operator interface 116 may be touch screen device 126.

Operator 112 may use operator interface 116 to make mode selection 124 indicating selected mode 114 of operating automatic braking system 102. For example, operator 112 may interact with touch screen device 126 to make mode selection 124. As another example, operator 112 may rotate mechanical device 122 to make mode selection 124. For example, mechanical device 122 may be configured to recognize rotation as an indication that selection of a next mode in available modes 108 is desired. In other words, mechanical device 122 may be free spinning such that mechanical device 122 does not include stops. Mode selection 124 may include an indication of a desire to change selected mode 114, an indication of selected mode 114 that is selected, or both an indication of a desire to change selected mode 114 and an indication of selected mode 114 that is selected.

Automatic braking system mode selection system 101 may also include display generator 128. Display generator 128 may be configured to generate and display available modes indications 136 and selected mode indication 134 based on mode selection 124 made by operator 112 using operator interface 116. Display generator 128 may be communicably coupled to display device 130 in instrument panel 118. For example, without limitation, display device 130 may be a multi-function display or any other appropriate display on aircraft 100. For example, without limitation, display device 130 may be a liquid crystal display (LCD) device, organic light-emitting diode (OLED) display, light emitting diode (LED) display, cathode ray tube display device, or other suitable display device type for use on flight deck 120 of aircraft 100.

Display device 130 may be configured to display graphical user interface 132. In accordance with various embodiments, graphical user interface 132 may include graphical and textual components that present information to operator 112. In various embodiments, touch screen device 126 may be coupled to display device 130. For example, touchscreen device 126 may be overlaid over display device 130.

Display device 130 may be configured to display graphical user interface 132 to display selected mode indication 134. Selected mode indication 134 may inform, alert, or advise operator 112 of selected mode 114. For example, without limitation, selected mode indication 134 may include a number of textual or graphical representations displayed on graphical user interface 132.

Graphical user interface 132 may also be configured to display available modes indications 136. Available modes indications 136 may inform, alert, or advise operator 112 of available modes 108 in operating modes 106 that are selectable based on operating condition 110. For example, graphical user interface 132 may display available modes indications 136 in first color 138 when automatic braking system controller 152 determines aircraft 100 is operating in first operating condition 140. For example, first operating condition 140 may be a condition for landing. Graphical user interface 132 may display available modes indications 136 in second color 142 when automatic braking system controller 152 determines that aircraft 100 is operating in second operating condition 144. For example, second operating condition 144 may be a condition for takeoff. First color 138 and second color 142 may be different from one another.

In accordance with various embodiments, graphical user interface 132 may be configured to remove from display selected mode indication 134 and available modes indications 136. For example, graphical user interface 132 may display selected mode indication 134 and available modes indications 136 for a predetermined or selected duration, in response to a change in selected mode 114, in response to a change in operating condition 110, or a combination thereof. For example, graphical user interface 132 may be configured to remove from display selected mode indication 134, available modes indications 136, both selected mode indication 134 and available modes indications 136, or all indications.

For example, without limitation, display device 130 may display selected mode indication 134 based on mode selection 124, and available modes indications 136 based on a determination of operating conditions 110 of the aircraft 100. Display device 130 may stop displaying selected mode indication 134 and available modes indications 136 in response to a determination that selected mode 114 is off mode 146 for more than selected duration 148. Display device 130 may then resume displaying selected mode indication 134 and available modes indications 136 in response to a change in mode selection 124. Alternatively or additionally, display device 130 may resume displaying selected mode indication 134 and available modes indications 136 in response to a determination that aircraft 100 is in-flight and operating condition 110 is for landing. In this manner, graphical user interface 132 may declutter display device 130.

In various embodiments, graphical user interface 132 may be configured to display automatic braking active indication 150 when automatic braking system 102 is actively controlling brakes 104 to decelerate aircraft 100. Automatic braking active indication 150 may indicate whether or not automatic braking system 102 is operating brakes 104 in a manner that is consistent with selected mode 114. For example, without limitation, automatic braking active indication 150 may include text indicating a measure of braking performance, such as a percentage of total braking performance or a measure of braking pressure applied to brakes 104. In other embodiments, automatic braking active indication 150 may include graphics, icons, and the like, in addition to, or in place of text.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 2:
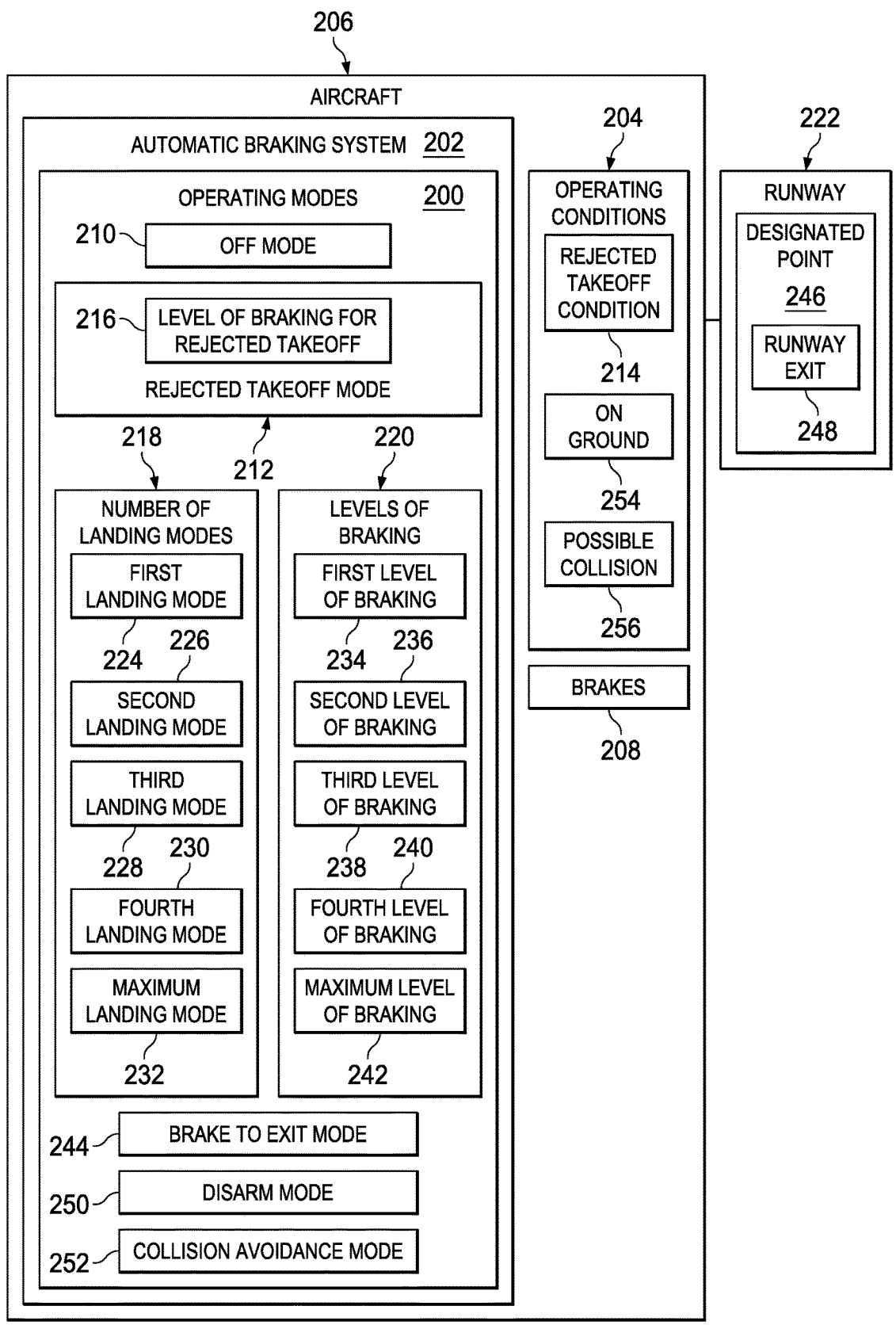
FIG. 2 is an illustration of a block diagram of operating modes for an automatic braking system in accordance with an illustrative embodiment.

Turning to FIG. 2, an illustration of a block diagram of operating modes 200 is depicted in accordance with an illustrative embodiment. Operating modes 200 may be examples of operating modes 106 in FIG. 1. Operating modes 200 describe various modes of operation that automatic braking system 202 is capable of performing. Operating modes 200 may be based on operating conditions 204 of aircraft 206. Operating modes 200 may control application of brakes 208 of aircraft 206 to decelerate or stop aircraft 206.

Operating modes 200 may include a number of modes that depend on the capabilities of aircraft 206 or automatic braking system 202. Operating modes 200 may be specific to aircraft 206 or a type of aircraft. For example, operating modes 200 may be based on a block of aircraft.

Operating modes 200 may include off mode 210. Off mode 210 may designate that automatic braking system 202 is not engaged. In off mode, brakes 208 are not activated automatically by automatic braking system 202. In other words, off mode 210 may designate that no automatic braking function will be performed. Off mode 210 may be a default mode such that off mode 210 is the selected mode of operation when no selection is made by the operator.

Operating modes 200 may also include rejected takeoff mode 212. Rejected takeoff mode 212 may designate that automatic braking system 202 activates brakes 208 in response to a determination that a current operating condition in operating conditions 204 is rejected takeoff condition 214. In other words, automatic braking system 202 activates brakes 208 when aircraft 206 is experiencing a rejected takeoff. Rejected takeoff mode 212 may designate that brakes 208 are automatically activated at an appropriate level of braking for rejected takeoff 216.

Operating modes 200 may also include number of landing modes 218. Number of landing modes 218 may provide selectable levels of braking 220 that automatic braking system 202 will provide by activating brakes 208 following landing of aircraft 206 on runway 222 and before aircraft 206 leaves runway 222 following the landing of aircraft 206. Levels of braking 220 may be defined based on an amount of braking force, a desired rate of deceleration, or in any other appropriate manner. For example, number of landing modes 218 may include first landing mode 224, second landing mode 226, third landing mode 228, fourth landing mode 230, and a maximum landing mode 232. First landing mode 224 may designate first level of braking 234, second landing mode 226 may designate second level of braking 236, third landing mode 228 may designate third level of braking 238, fourth landing mode 230 may designate fourth level of braking 240, and maximum landing mode 232 may designate maximum level of braking 242. In this manner, landing modes 218 designate levels of braking 220 having increasing levels of braking. For example, second level of braking 236 may indicate a level of braking to achieve deceleration greater than first level of braking 234.

Operating modes 200 may include brake to exit mode 244. In brake to exit mode 244, automatic braking system 202 automatically controls brakes 208 following landing of aircraft 206 to slow aircraft 206 to no more than a selected target speed before aircraft 206 reaches designated point 246 on runway 222. For example, automatic braking system 202 may stop aircraft 206 at designated point 246 on runway 222. As another example, automatic braking system 202 may slow aircraft 206 such that aircraft 206 is moving at no more than the selected target speed when aircraft 206 reaches designated point 246. Designated point 246 may be a predetermined location on runway 222, such as, for example, runway exit 248. A selection of a level of braking in levels of braking 220 for brake to exit mode 244 may be based on a distance between a position of aircraft 206 and designated point 246.

Operating modes 200 may include disarm mode 250. Disarm mode 250 may indicate that a selected operating mode is no longer an available mode.

Operating modes 200 may include collision avoidance mode 252. Collision avoidance mode 252 may designate that automatic braking system 202 activates brakes 208 when aircraft 206 is moving on ground 254 and possible collision 256 of aircraft 206 is detected. Possible collision 256 may be detected between aircraft 206 and a stationary or moving object on ground 254, such as, for example, a jet-way or another vehicle. Detection of possible collision 256 may be triggered when a distance, for example, in meters or feet, between aircraft 206 and another stationary or moving object on ground 254 is less than a threshold distance.

Alternatively, or in addition, detection of possible collision 256 may be triggered when a time, for example, in seconds, until possible contact between aircraft 206 and another stationary or moving object on ground 254 is less than a threshold time. Collision avoidance mode 252 also may be in effect as a function of the location of aircraft 206 on ground 254. For example, without limitation, collision avoidance mode 252 may be in effect when aircraft 206 is on airport taxiways and ramps but not when aircraft 206 is on runway 222 or when aircraft 206 is on a takeoff roll.

An operating mode in operating modes 200 may be activated by an operator selecting the operating mode to activate using an automatic braking system mode selection system in accordance with an illustrative embodiment. Automatic braking system 202 then may operate brakes 208 automatically in the manner defined by the activated operating mode. Alternatively, or in addition, more than one operating mode in operating modes 200 may be activated by an operator selecting one of operating modes 200. For example, without limitation, collision avoidance mode 252 may be activated automatically along with rejected takeoff mode 212 when rejected takeoff mode 212 is selected by an operator to reduce or eliminate collision of an aircraft as it moves on ground 254 into position for takeoff. As another example, without limitation, collision avoidance mode 252 may be activated automatically along with one of number of landing modes 218, brake to exit mode 244, or both one of number of landing modes 218 and brake to exit mode 244, when one of number of landing modes 218 or brake to exit mode 244 is selected by an operator.

Figure 3:
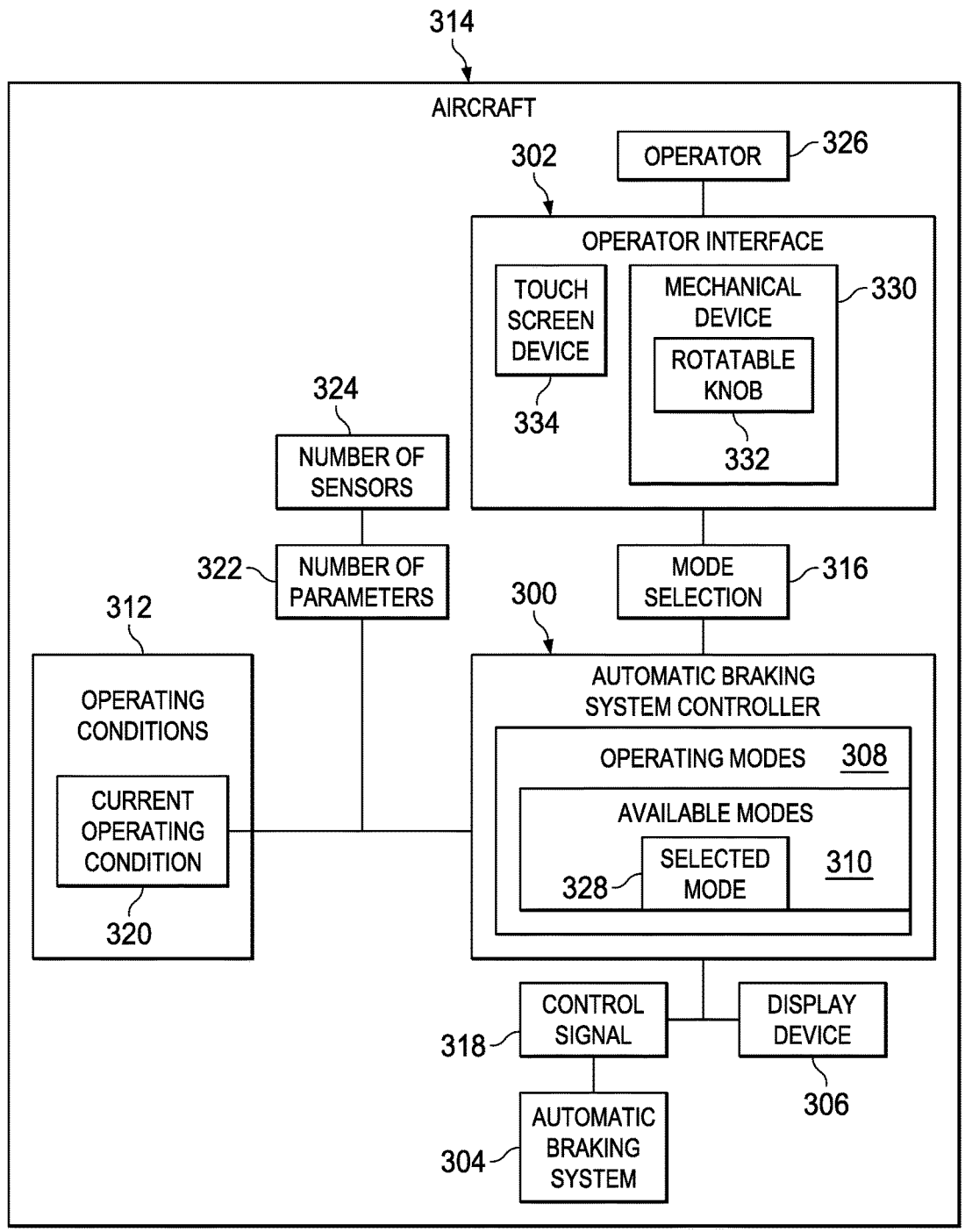
FIG. 3 is an illustration of a block diagram of an automatic braking system mode selection system in accordance with an illustrative embodiment.

Turning to FIG. 3, an illustration of a block diagram of an automatic braking system controller is depicted in accordance with an illustrative embodiment. Automatic braking system controller 300 may be an example of one implementation of automatic braking system controller 152 in FIG. 1.

Automatic braking system controller 300 may be communicatively coupled to operator interface 302, automatic braking system 304, and display device 306, among other components. Automatic braking system controller 300 determines which operating modes 308 are available modes 310 based on operating conditions 312 of aircraft 314. Automatic braking system controller 300 may also receive mode selection 316 from operator interface 302 to provide control signal 318 to automatic braking system 304.

Automatic braking system controller 300 may determine available modes 310 based on current operating condition 320 in operating conditions 312. Current operating condition 320 may be an operating condition in operating conditions 110 of FIG. 1. Automatic braking system controller 300 may receive number of parameters 322 from number of sensors 324 to determine current operating condition 320. For example, number of parameters 322 may include a weight on wheels indication, which signifies when the weight of aircraft 314 is being carried on the wheels. In other words, the weight on wheels indication may determine whether aircraft 314 is on ground or is in flight. As another example, number of parameters 322 may include a measure of longitudinal acceleration, which may be a measure of an amount of acceleration along a longitudinal axis of aircraft 314. The longitudinal acceleration may be used to indicate a rejected takeoff condition. As another example, number of parameters 322 may include a flap setting indicating an amount of deployment of flaps of aircraft 314. The flap setting may be used to indicate an approach or takeoff condition. As other examples, number of parameters 322 may include the configuration of folding wing tips, availability of thrust reversers, other parameters, or various combinations of parameters that may be used to identify current operating condition 320. As another example, operator 326 may interact with operator interface 302 to indicate current operating condition 320. In various embodiments, number of parameters 322 may be monitored to determine a change in current operating condition 320.

Operator 326 may interact with operator interface 302 to select selected mode 328 from available modes 310. Automatic braking system controller 300 may be communicatively coupled to operator interface 302 to receive mode selection 316. Operator interface 302 may be an example of one implementation of operator interface 116 in FIG. 1. Operator interface 302 may comprise mechanical device 330 that is movable by operator 326 to select selected mode 328 from available modes 310. For example, mechanical device 330 may comprise rotatable knob 332. Operator interface 302 may generate mode selection 316 in response to a rotation of rotatable knob 332. In other embodiments, other arrangements are possible. For example, operator interface 302 may comprise touch screen device 334. Touch screen device 334 may generate mode selection 316 via interaction of operator 326 with touch screen device 334.

Figure 4:
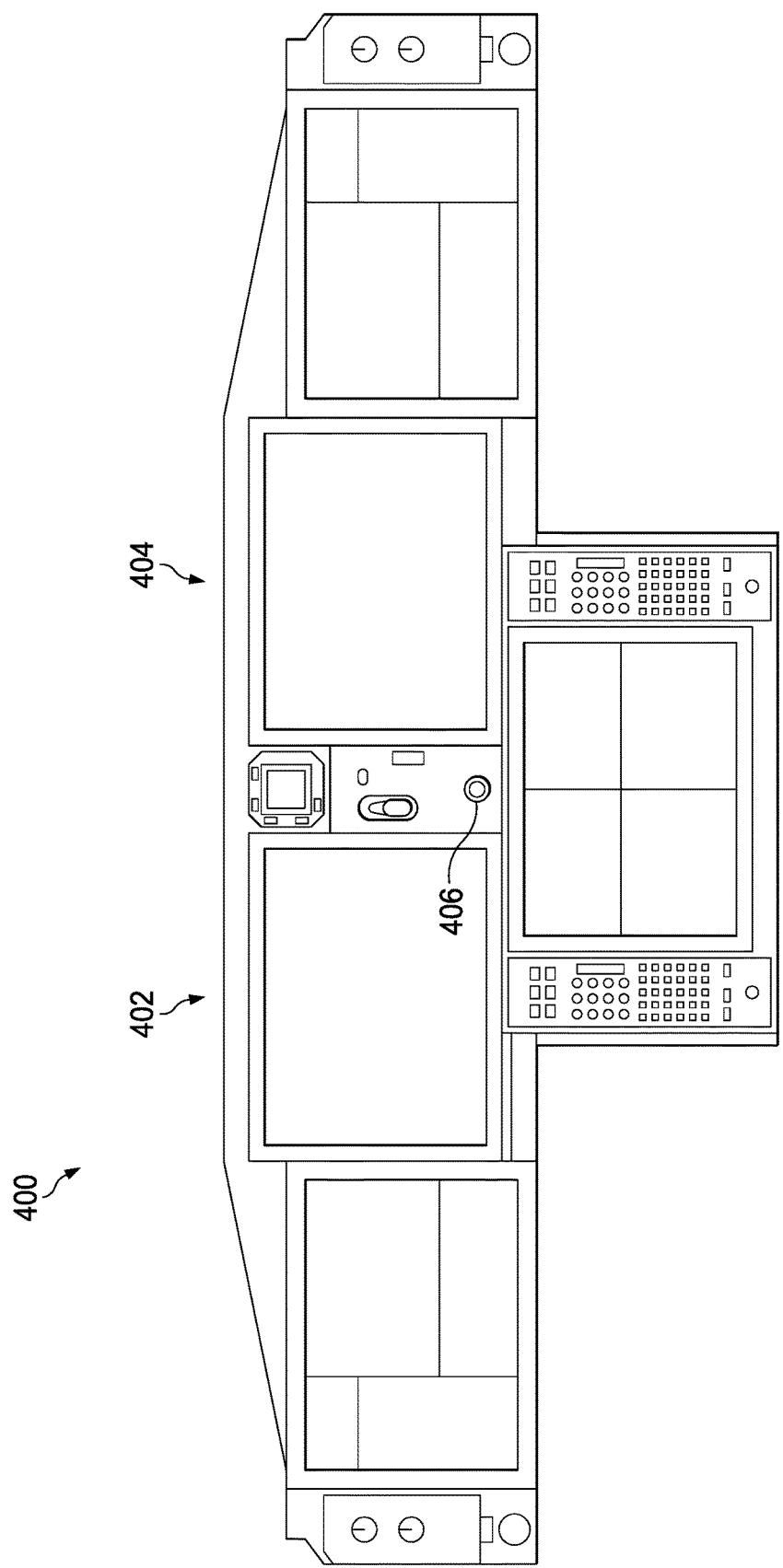
FIG. 4 is an illustration of an instrument panel on a flight deck of an aircraft in accordance with an illustrative embodiment.

Turning to FIG. 4, an illustration of an instrument panel on a flight deck of an aircraft is depicted in accordance with an illustrative embodiment. Instrument panel 400 may be an example of one implementation of instrument panel 118 in FIG. 1.

Instrument panel 400 includes first display device 402 and second display device 404. First display device 402 and second display device 404 may be examples of implementations of display device 130 in FIG. 1. In other embodiments, first display device 402 and second display device 404 may be implementations of touch screen device 126 in FIG. 1.

First display device 402 may be an engine-indicating and crew-alerting system (EICAS). An engine-indicating and crew-alerting system is an integrated system that may be used on aircraft to provide the aircraft crew with instrumentation for the aircraft engines and other systems on the aircraft. An engine-indicating and crew-alerting system typically includes instrumentation for various engine parameters, including, for example, rotational speeds, temperature values, fuel flow and quantity, oil pressure, and the like. Typical other aircraft systems monitored by an engine-indicating and crew-alerting system are, for example, hydraulic, pneumatic, electrical, deicing, environmental, and control surface systems. While most of the display area on the flight deck of an aircraft may be used for navigation and orientation displays, one display or a section of a display typically is set aside specifically for an engine-indicating and crew-alerting system display. In various embodiments, automatic braking mode selection information may also be presented on the engine-indicating and crew-alerting system display.

Instrument panel 400 also includes rotatable knob 406. Rotatable knob 406 may be an implementation of operator interface 116 in FIG. 1. Rotatable knob 406 is mounted on the center console of instrument panel 400. In other embodiments, other arrangements are possible.

Figure 5:
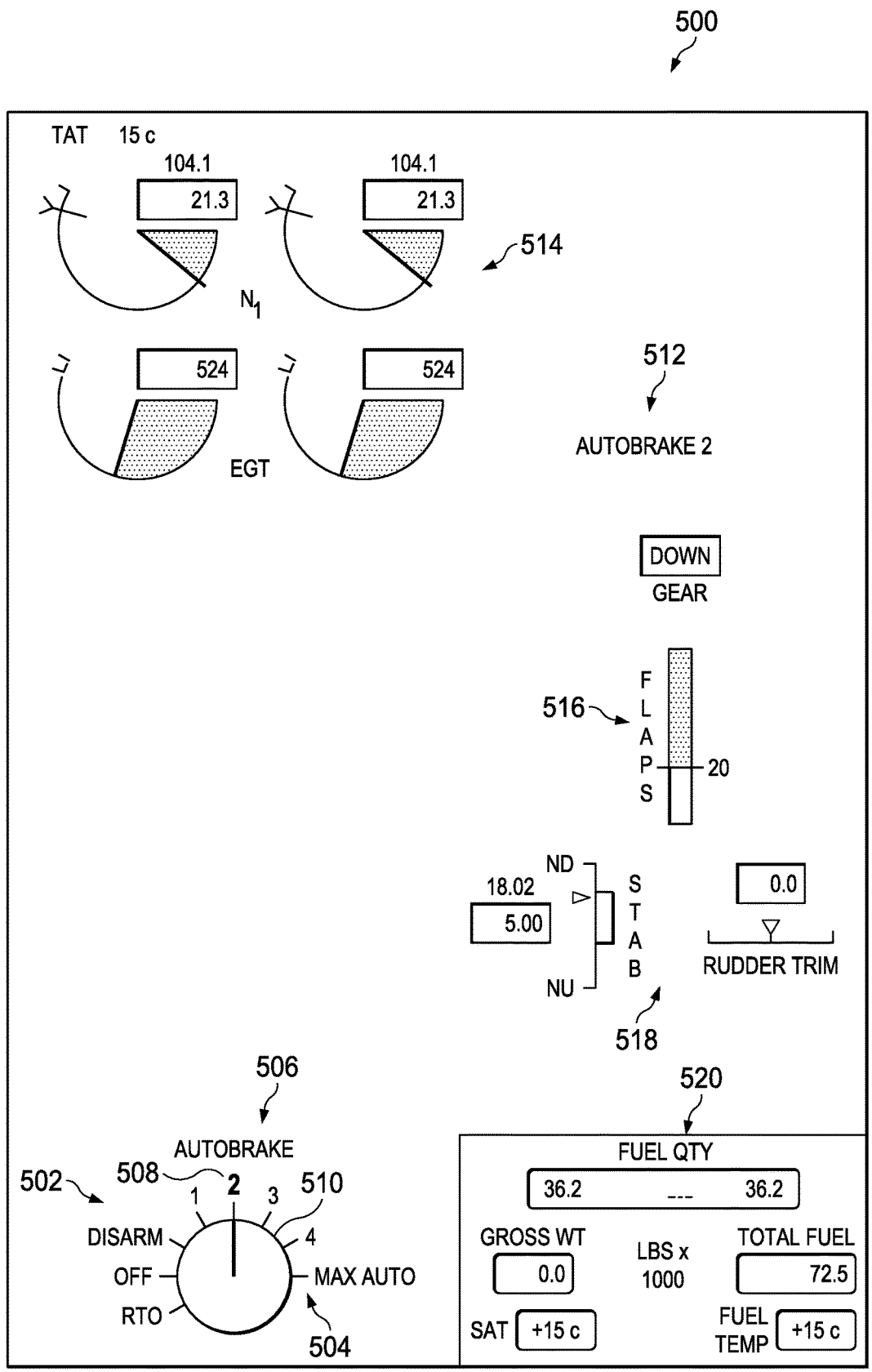
FIG. 5 is an illustration of an automatic braking system mode selection display in accordance with an illustrative embodiment.

Turning to FIG. 5, an illustration of an automatic braking system mode selection display is depicted in accordance with an illustrative embodiment. For example, without limitation, mode selection display 500 may be displayed on display device 130 in FIG. 1 or on first display device 402 or second display device 404 in FIG. 4.

Mode selection display 500 includes graphical user interface 502. Graphical user interface 502 may be an example of one implementation of graphical user interface 132 in FIG. 1. Graphical user interface 502 includes operating modes indications 504, available modes indications 506, and selected mode indicator 508, among other things. Operating modes indications 504 identify the operating modes that the automatic braking system on an aircraft is capable of performing. Operating modes indications 504 may include available modes indications 506 and selected mode indicator 508. Operating modes indications 504 may be displayed around virtual knob 510. In this example, operating modes indications 504 are arranged circumferentially around virtual knob 510. Virtual knob 510 may be a graphical representation of a physical knob. Virtual knob 510 may be animated to rotate as an operator rotates a rotatable knob on an instrument panel. Virtual knob 510 may be displayed in an orientation pointing to one of available modes indications 506 to indicate selected mode indicator 508. In other embodiments, other arrangements are possible. For example, operating modes indications 504 may be arranged in a grid pattern.

In this example, selected mode indicator 508 also includes displaying the operating mode indicator for the selected mode in bold. Selected mode indicator 508 also or alternatively may be implemented by highlighting or using another appropriate indication or combination of indications to draw attention to the indicator for the selected operating mode.

Mode selection display 500 includes automatic braking active indication 512. Automatic braking active indication 512 is an example of one implementation of automatic braking active indication 150 in FIG. 1. Automatic braking active indication 512 indicates that the automatic braking system is activating the brakes. Automatic braking active indication 512 may indicate whether or not the automatic braking system is operating the brakes in a manner that is consistent with the selected operating mode. For example, without limitation, automatic braking active indication 512 may indicate a current level of braking that is being provided by the automatic braking system. The level of braking indicated by automatic braking active indication 512 may be compared to the level of braking selected in the selected operating mode. In this example, automatic braking active indication 512 comprises text. In other embodiments, automatic braking active indication 512 may include graphics, icons, and the like, in addition to, or in place of the text.

Mode selection display 500 may be displayed on a display device along with other appropriate indicators providing information for operating an aircraft. For example, without limitation, mode selection display 500 may be displayed along with engine parameter indicators 514, flap position indicator 516, stabilizer trim and rudder trim indicators 518, fuel system indicators 520, other appropriate indicators, or various combinations of appropriate indicators.

Figure 6:
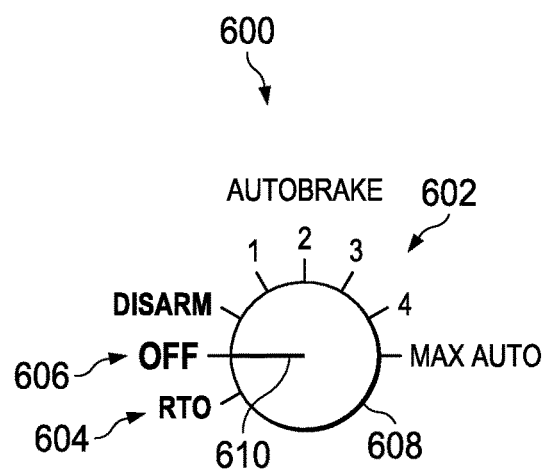
FIG. 6 is an illustration of an automatic braking system mode selection display for an aircraft on the ground in accordance with an illustrative embodiment.

FIG. 6 is an illustration of an automatic braking system mode selection display for an aircraft on the ground in accordance with an illustrative embodiment. Mode selection display 600 may be an example of graphical user interface 502 in mode selection display 500 in FIG. 5. Mode selection display 600 shows an example of operating mode indications 602, available modes indications 604, and selected mode indication 606 when the aircraft is on the ground.

Available modes indications 604 may include displaying operating mode indications 602 for available modes in a different color or in another appropriate manner to distinguish indications for modes of operating the automatic braking system that are available for selection by an operator from indications for modes that are not available for selection in mode selection display 600. In this example, available modes indications 604 show operating modes "RTO," "OFF," and "DISARM" are available for selection, while operating modes "1," "2," "3," "4," and "MAX AUTO," are not available for selection.

Selected mode indication 606 may include displaying the operating mode indication in operating mode indications 602 for the selected operating mode in bold, in a different color, or in any other appropriate manner to distinguish the indication for the selected operating mode from indications for modes that are not selected. In this example, selected mode indication 606 also includes marking 610 on virtual knob 608 pointing to the indicator for the selected mode. In this example, selected mode indication 606 indicates that operating mode "OFF" is selected.

Figure 7:
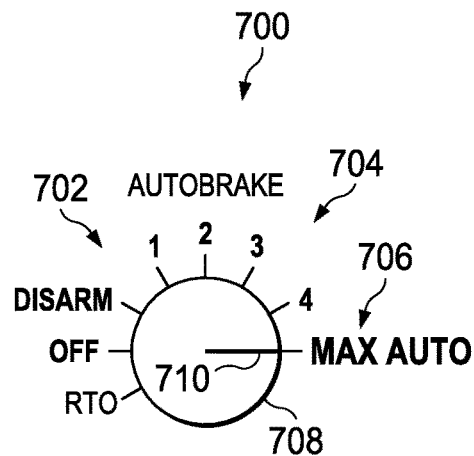
FIG. 7 is an illustration of an automatic braking system mode selection display for an aircraft in the air in accordance with an illustrative embodiment.

FIG. 7 is an illustration of an automatic braking system mode selection display for an aircraft in the air in accordance with an illustrative embodiment. Mode selection display 700 may be an example of graphical user interface 502 in mode selection display 500 in FIG. 5. Mode selection display 700 shows an example of operating mode indications 702, available modes indications 704, and selected mode indication 706 when the aircraft is in the air.

Available modes indications 704 may include displaying operating mode indications 702 for available modes in a different color or in another appropriate manner to distinguish indications for modes of operating the automatic braking system that are available for selection by an operator from indications for modes that are not available for selection in mode selection display 700. In this example, available modes indications 704 show operating modes "OFF," "DISARM," "1," "2," "3," "4," and "MAX AUTO," are available for selection, while operating mode "RTO" is not available for selection. In other embodiments, other arrangements are possible. For example, in certain embodiments, "DISARM" may not be indicated as a mode available for selection by an operator.

Selected mode indication 706 may include displaying the operating mode indication in operating mode indications 702 for the selected operating mode in bold, in a different color, or in any other appropriate manner to distinguish the indication for the selected operating mode from indications for modes that are not selected. In this example, selected mode indication 706 also includes marking 710 on virtual knob 708 pointing to the indicator for the selected mode. In this example, selected mode indication 706 indicates that operating mode "MAX AUTO" is selected.

Figure 8:
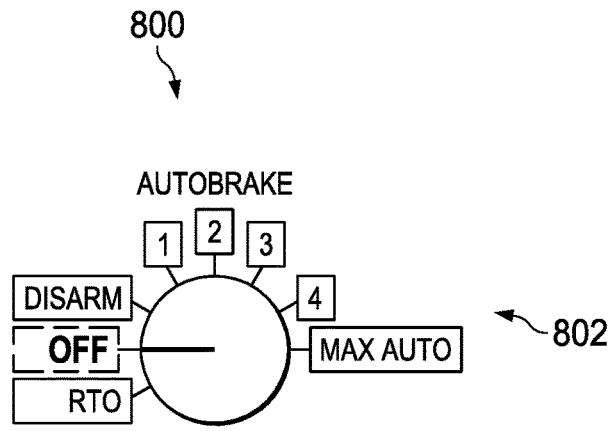
FIG. 8 is an illustration of an automatic braking system mode selection display with a graphical user interface in accordance with an illustrative embodiment.

FIG. 8 is an illustration of an automatic braking system mode selection display with a graphical user interface in accordance with an illustrative embodiment. Graphical user interface 800 may be an implementation of graphical user interface 132 in FIG. 1. Graphical user interface 800 may include boxes depicting virtual buttons 802. Virtual buttons 802 may be part of graphical user interface 800 configured to be implemented with a touch screen device, such as touch screen device 126 in FIG. 1. Virtual buttons 802 may be used by an operator to select a selected mode of operation. For example, an operator may select a mode of operating the automatic braking system by touching a region bound by one of virtual buttons 802 for the mode to be selected.

Figure 9:
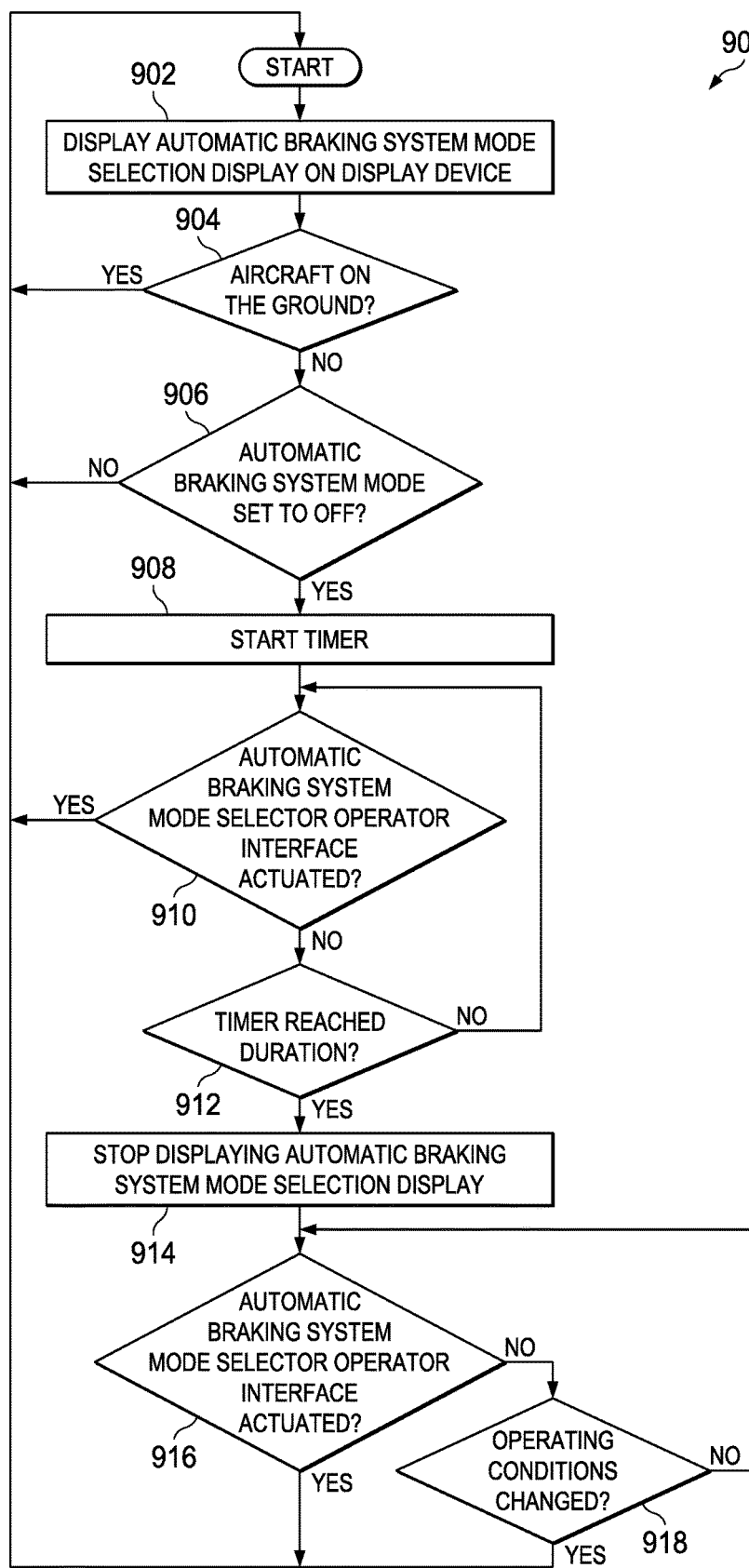
FIG. 9 is an illustration of a flowchart of a process for controlling an automatic braking system on an aircraft in accordance with an illustrative embodiment.

FIG. 9 is an illustration of a flowchart of a process for controlling the displaying of an automatic braking system mode selection display on a display device on an aircraft in accordance with an illustrative embodiment. Process 900 may be implemented in automatic braking system controller 300 to selectively show and hide graphical user interface 132 on display device 130 on aircraft 100.

Process 900 begins by displaying automatic braking system mode selection display on a display device (operation 902). It is then determined if the aircraft is on the ground (operation 904). If the aircraft is on ground, mode selection display is repeatedly displayed until operation 904 determines that aircraft is not on the ground.

Process 900 may stop displaying on the display device the available modes indications and the selected mode indication in response to a determination that the selected mode is an off mode for more than a selected duration. A determination is then made if the selected mode of the automatic braking system is set to an off mode (operation 906). If the selected mode is not set to an off mode, then process 900 repeats to repeatedly display mode selection display. If the selected mode is set to an off mode, then a timer is stated (operation 908). The timer may be set for a selected duration, which may be a predetermined amount of time. For example, the duration may be a threshold value, such as, for example 15 seconds, 30, seconds, 60 seconds, 120 seconds, or any suitable amount of time.

Process 900 may resume displaying on the display device the available modes indications and the selected mode indication in response to a change in the selected mode signal received from the operator interface or a determination that an operating condition of the aircraft has changed. For example, process 900 may resume displaying the available modes indications and the selected mode indication in response to a determination that the aircraft has changed to an on-approach state. As another example, process 900 may resume displaying the available modes indications and the selected mode indication in response to a determination that a flap setting has changed. As another example, process 900 may resume displaying the available modes indications and the selected mode indication in response to the operator entering information a display unit. A determination is made if an operator has actuated an operator interface (operation 910). If the operator has actuated the operator interface, process 900 repeats to repeatedly display mode selection display. It is then determined if timer has reached the threshold duration of time (operation 912). If the timer has reached the threshold duration value, the user interface stops displaying mode selection display (operation 914). In other words, mode selection display is hidden and not shown on user interface if the operator does not interact with the operator interface for a predetermined duration.

A determination is then made if an operator has actuated an operator interface (operation 916). If the operator has actuated the operator interface, process 900 repeats to repeatedly display mode selection display. If the operator has not actuated the operator interface, a determination is made to check if operating conditions of the aircraft have changed (operation 918). If operating conditions of the aircraft have changed, process 900 repeats to repeatedly display mode selection display. Otherwise, process 900 returns to operation 916 to determine if the operator has actuated the operator interface.

Figure 10:
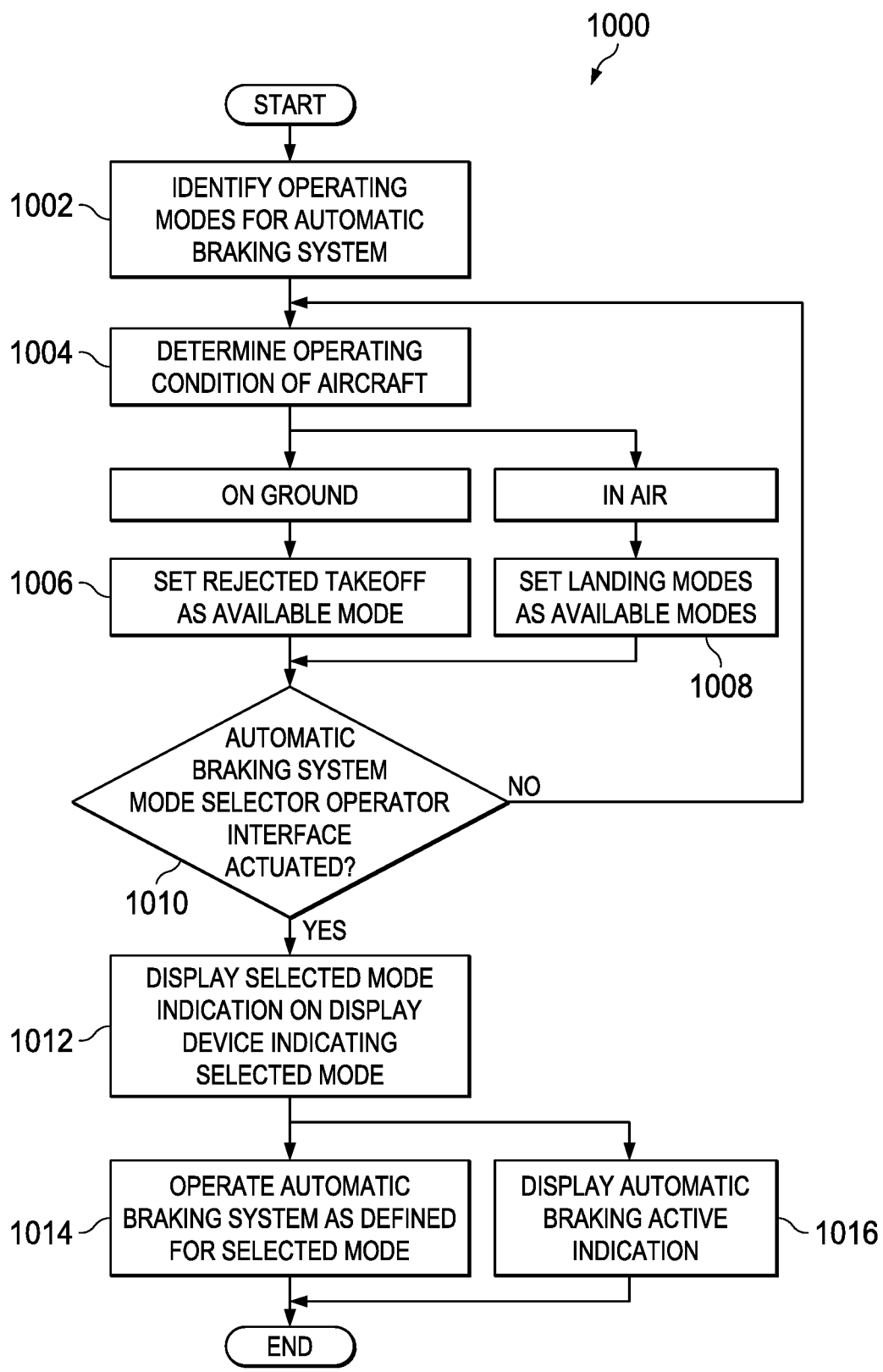
FIG. 10 is an illustration of a flowchart of a process for controlling the displaying of an automatic braking system mode selection display on a display device on an aircraft in accordance with an illustrative embodiment.

FIG. 10 is an illustration of a flowchart of a process for controlling an automatic braking system on an aircraft in accordance with an illustrative embodiment. Process 1000 may be implemented in automatic braking system controller 300 to selectively show and hide available modes indications 136 on graphical user interface 132 in display device 130 on aircraft 100.

Process 1000 begins by identifying operating modes for the automatic braking system (operation 1002). The operating modes may be predetermined based on the capabilities of the aircraft. An operating condition of the aircraft is then determined (operation 1004).

If the operating condition of the aircraft indicates that the aircraft is on ground, then rejected takeoff, "RTO", is set as an available mode from the operating modes (operation 1006). In other embodiments, other modes may be set as available for selection when the aircraft operating condition is on ground, such as, for example, a collision avoidance mode. If the operating condition of the aircraft indicates that the aircraft is in the air, then landing modes are set as available modes from the operating modes (operation 1008).

A determination is then made to determine if an operator has actuated the operator interface to select one of the available modes (operation 1010). If selected, then the selected mode is displayed on the display device (operation 1012). If the operator does not make a selection, then the process repeats to determine the operating condition of the aircraft (operation 1004). Process 1000 may then operate the automatic braking system as defined for the selected mode (operation 1014), with the process terminating thereafter. Process 1000 may also display an automatic braking active indication on the display indicating operation of the automatic braking system (operation 1016).

Figure 11:
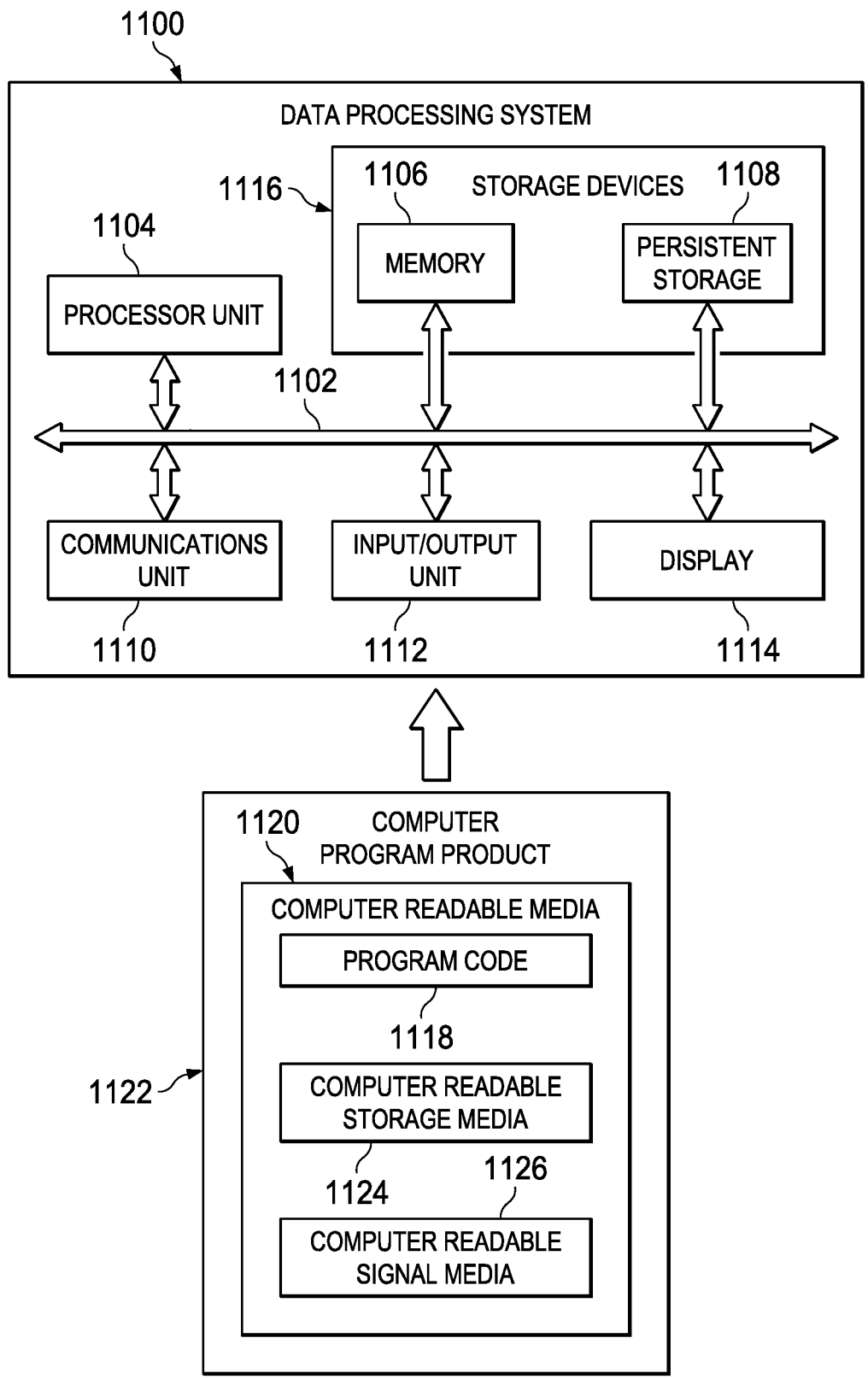
FIG. 11 is an illustration of a block diagram of a data processing system in accordance with an illustrative embodiment.

FIG. 11 is an illustration of a block diagram of a data processing system in accordance with an illustrative embodiment. Data processing system 1100 may be an example of one implementation of automatic braking system mode selection system 101 in FIG. 1. Data processing system 1100 may be used to implement the methods shown in FIG. 9 and FIG. 10.

In this illustrative example, data processing system 1100 includes communications fabric 1102. Communications fabric 1102 provides communications between processor unit 1104, memory 1106, persistent storage 1108, communications unit 1110, input/output (I/O) unit 1112, and display 1114. Memory 1106, persistent storage 1108, communications unit 1110, input/output unit 1112, and display 1114 are examples of resources accessible by processor unit 1104 via communications fabric 1102.

Processor unit 1104 serves to run instructions for software that may be loaded into memory 1106. Processor unit 1104 may be a number of processors, a multi-processor core, or some other type of processor, depending on the particular implementation. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information such as, for example, without limitation, data, program code in functional form, and other suitable information either on a temporary basis or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

Persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions may be referred to as program instructions, program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126.

Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, or any other suitable type of signal. These signals may be transmitted over communications links, such as wireless communications links, optical fiber cable, coaxial cable, a wire, or any other suitable type of communications link. In other words, the communications link or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server onto data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code. As one example, data processing system 1100 may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system.

Additionally, communications unit 1110 may include a number of devices that transmit data, receive data, or transmit and receive data. Communications unit 1110 may be, for example, a modem or a network adapter, two network adapters, or some combination thereof. Further, a memory may be, for example, memory 1106, or a cache, such as that found in an interface and memory controller hub that may be present in communications fabric 1102.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of illustrative embodiments is presented for purposes of illustration and description and is not intended to be exhaustive or to limit the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated. Further, the features described herein and in the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A method of braking an aircraft, comprising:
   identifying, by a processor unit, an operating condition of the aircraft;
   displaying, by the processor unit on a display device on the aircraft, available modes indications indicating modes of operating an automatic braking system on the aircraft that are available for selection by an operator based on the operating condition of the aircraft;
   receiving, by the processor unit from an operator interface, a mode selection indicating a selected mode of operating the automatic braking system that is selected by the operator from the available modes; and
   displaying, by the processor unit on the display device, a selected mode indication indicating the selected mode.

2. The method of claim 1, wherein the operator interface and the display device are on a flight deck of the aircraft.

3. The method of claim 1, wherein the available modes are selected from a plurality of modes of operating the automatic braking system selected from the group of operating modes consisting of:
   an off mode in which brakes will not be activated by the automatic braking system;
   a rejected takeoff mode in which the brakes are activated automatically by the automatic braking system in response to a rejected takeoff;
   a landing mode in which the brakes are activated automatically by the automatic braking system with a selectable level of braking following landing of the aircraft on a runway and before the aircraft leaves the runway following the landing of the aircraft on the runway;
   a brake to exit mode in which the brakes are activated automatically by the automatic braking system following the landing of the aircraft to slow the aircraft to no more than a target speed when the aircraft reaches a designated point following the landing of the aircraft; and
   a collision avoidance mode in which the brakes are activated automatically by the automatic braking system when the aircraft is moving on ground and a possible collision of the aircraft is detected.

4. The method of claim 3, wherein the collision avoidance mode is activated when the rejected takeoff mode is the selected mode or when the landing mode is the selected mode or when the brake to exit mode is the selected mode.

5. The method of claim 1, wherein the operator interface comprises a mechanical device that is moveable by the operator to select the selected mode from the available modes.

6. The method of claim 1, wherein the operator interface comprises a graphical user interface displayed on the display device and comprising the available modes indications.

7. The method of claim 1, wherein displaying the available modes indications based on the operating condition of the aircraft comprises displaying the available modes indications in a first color when the aircraft is in a first operating condition and displaying the available modes indications in a second color that is different from the first color when the aircraft is in a second operating condition that is different from the first operating condition.

8. The method of claim 1 further comprising:
   stopping displaying, on the display device, the available modes indications and the selected mode indication in response to a determination that the selected mode is an off mode for more than a selected duration; and
   resuming displaying, on the display device, the available modes indications and the selected mode indication in response to a change in the selected mode received from the operator interface or a determination that the operating condition of the aircraft has changed.

9. The method of claim 1 further comprising:
   controlling braking of the aircraft by the automatic braking system based on the selected mode; and
   displaying by the processor unit on the display device an automatic braking active indication to indicate when brakes are activated by the automatic braking system.

10. A system, comprising:
    an operator interface; and
    a display generator configured to display, on a display device on an aircraft, available modes indications indicating available modes of operating an automatic braking system on the aircraft that are available for selection by an operator based on an operating condition of the aircraft and a selected mode indication indicating a selected mode of operating the automatic braking system that is selected by the operator from the available modes using the operator interface.

11. The system of claim 10, wherein the operator interface and the display device are on a flight deck of the aircraft.

12. The system of claim 10, wherein the available modes are selected from a plurality of modes of operating the automatic braking system selected from the group of operating modes consisting of:
- an off mode in which brakes will not be activated by the automatic braking system;
- a rejected takeoff mode in which the brakes are activated automatically by the automatic braking system in response to a rejected takeoff;
- a landing mode in which the brakes are activated automatically by the automatic braking system with a selectable level of braking following landing of the aircraft on a runway and before the aircraft leaves the runway following the landing of the aircraft on the runway;
- a brake to exit mode in which the brakes are activated automatically by the automatic braking system following the landing of the aircraft to slow the aircraft to no more than a target speed when the aircraft reaches a designated point following the landing of the aircraft; and
- a collision avoidance mode in which the brakes are activated automatically by the automatic braking system when the aircraft is moving on ground and a possible collision of the aircraft is detected.

13. The system of claim 12, wherein the collision avoidance mode is activated when the rejected takeoff mode is the selected mode or when the landing mode is the selected mode or when the brake to exit mode is the selected mode.

14. The system of claim 10, wherein the operator interface comprises a mechanical device that is moveable by the operator to select the selected mode from the available modes.

15. The system of claim 10, wherein the operator interface comprises a graphical user interface generated by the display generator, displayed on the display device, and comprising the available modes indications.

16. The system of claim 10, wherein the display generator is configured to display the available modes indications in a first color when the aircraft is in a first operating condition and display the available modes indications in a second color that is different from the first color when the aircraft is in a second operating condition that is different from the first operating condition.

17. The system of claim 10, wherein the display generator is further configured to:
- stop displaying, on the display device, the available modes indications and the selected mode indication in response to a determination that the selected mode is an off mode for more than a selected duration; and
- resume displaying, on the display device, the available modes indications and the selected mode indication in response to a change in the selected mode received from the operator interface or a determination that the operating condition of the aircraft has changed.

18. The system of claim 10 further comprising:
- an automatic braking system controller configured to receive from the operator interface a mode selection indicating the selected mode of operating the automatic braking system and to control braking of the aircraft by the automatic braking system based on the selected mode; and
- wherein the display generator is configured to display, on the display device, an automatic braking active indication to indicate when brakes are activated by the automatic braking system.

19. A system, comprising:
- an operator interface comprising a rotatable knob; and
- a display generator configured to display, on a display device on an aircraft, available modes indications indicating available modes of operating an automatic braking system on the aircraft that are available for selection by an operator based on an operating condition of the aircraft and a selected mode indication indicating a selected mode of operating the automatic braking system that is selected by the operator from the available modes by rotating the rotatable knob.

20. The system of claim 19, wherein the display generator is configured to display, on the display device, a graphical representation of a knob, wherein the available modes indications are displayed around the graphical representation of the knob, and the graphical representation of the knob is displayed in an orientation pointing to a one of the available modes indications to indicate the selected mode.

* * * * *